Patented Sept. 14, 1926.

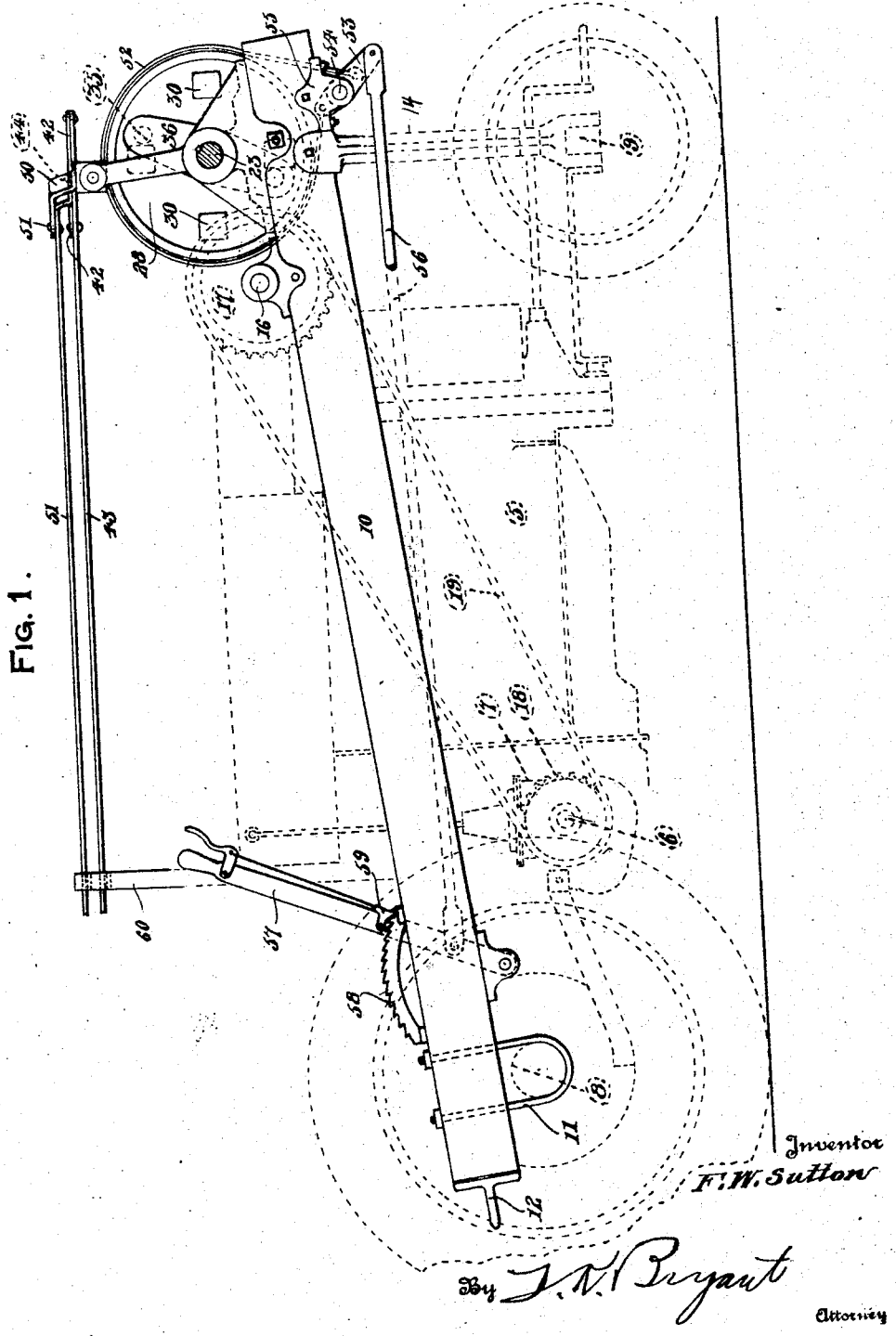

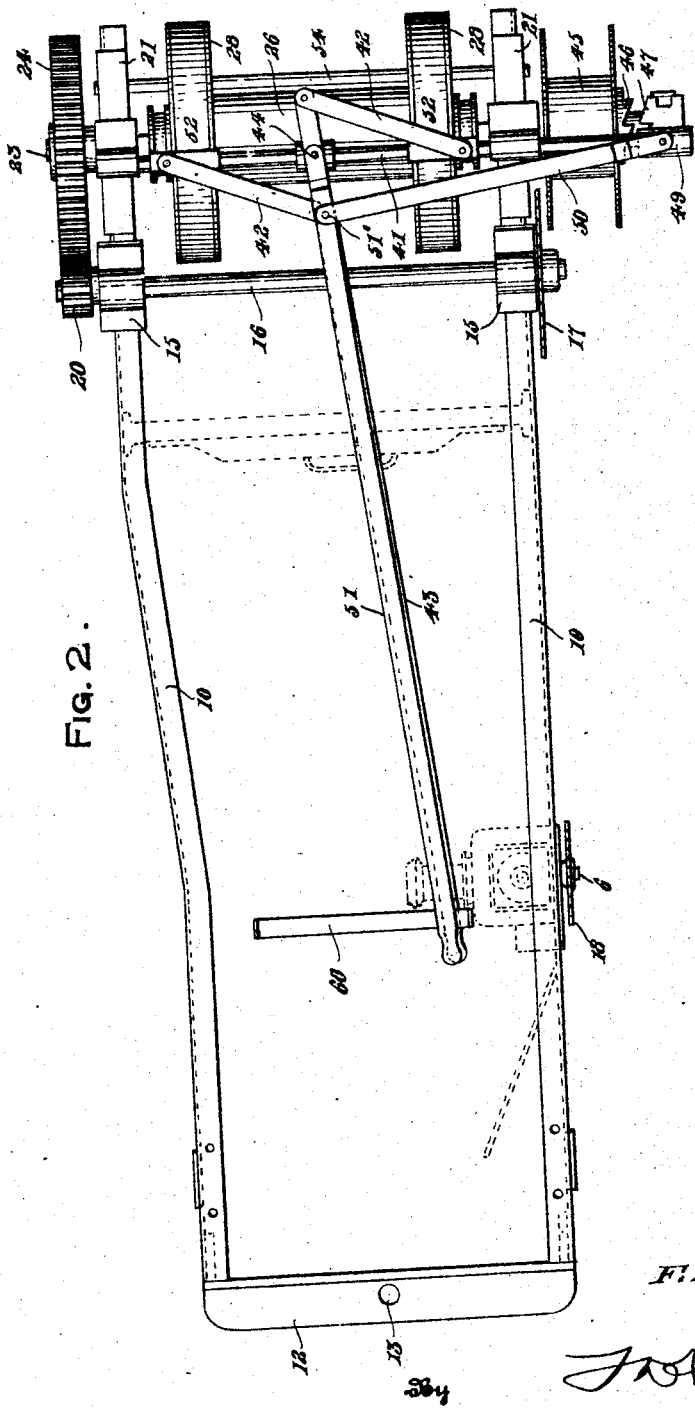

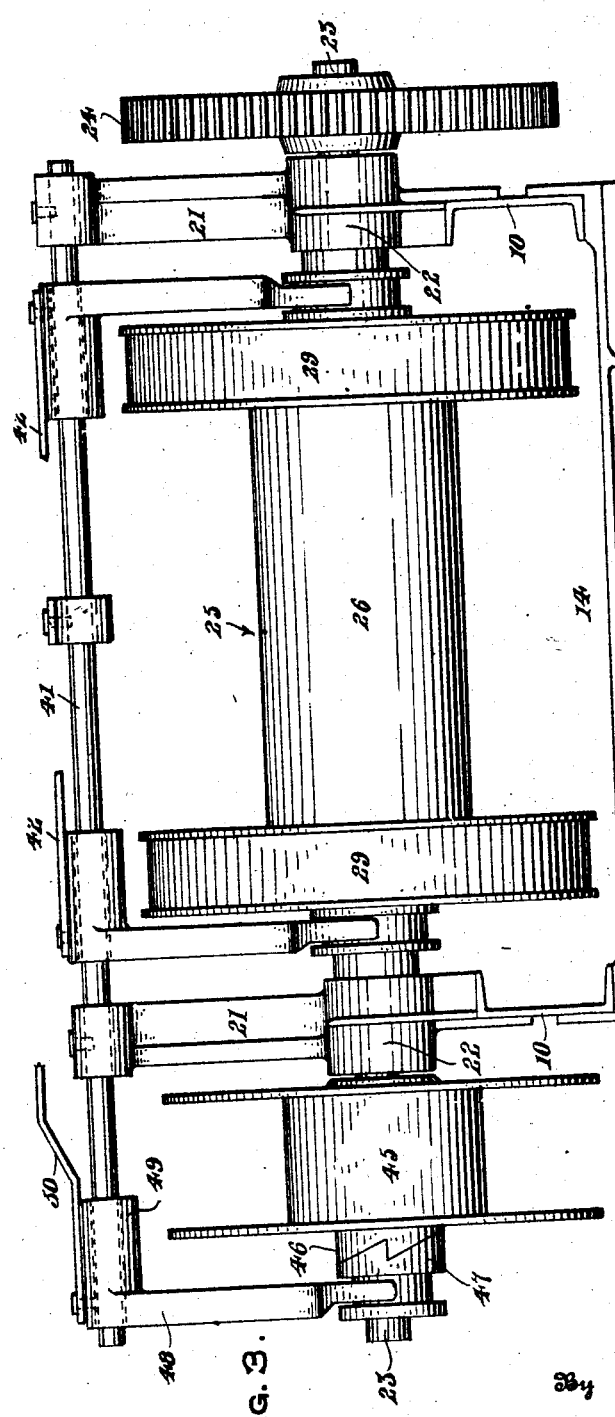

1,600,151

UNITED STATES PATENT OFFICE.

FRANK W. SUTTON, OF TULSA, OKLAHOMA.

WINCH.

Application filed March 26, 1925. Serial No. 18,501.

This invention relates to improvements in winches of the type particularly adapted to be mounted upon and driven by a movable power plant, such as a tractor, although not limited to such a use.

The primary object of this invention is to provide a winch structure including a supporting frame which may be mounted on a tractor, preferably of the type having a speed change mechanism, and driven by the power plant of the same; said speed change mechanism being employed to vary the pulling power of the winch in proportion with the load applied thereto.

A further object of the invention is to provide a winch structure having a plurality of winding drums and means for independently connecting and disconnecting the winding drums from their driving means, whereby they may be driven independently or in unison.

A still further object of the invention is to provide an improved form of clutch and control for power driven winch drums.

Other objects and advantages of the invention will be apparent during the course of the following description.

In the accompanying drawings forming a part of this specification and in which like numerals are employed to designate like parts throughout the same, Figure 1 is a side elevational view of a tractor, shown in dotted lines, and the winch structure embodying this invention, shown in full lines, Figure 2 is a top plan view of the winch structure embodying this invention, Figure 3 is a fragmentary enlarged elevational view of the winch structure, Figure 4 is a detail vertical sectional view of one end of the main frame and one of the clutch structures associated therewith, and Figure 5 is a fragmentary end elevational view of the main drum and clearly illustrates a portion of the clutch structure associated therewith.

In the drawings, wherein for the purpose of illustration is shown a preferred embodiment of this invention, the numeral 5 designates a tractor including a power shaft 6 which is connected to the power plant of the tractor and operatively controlled by the speed change mechanism 7, which may be of any desired construction. The remaining portions of the tractor 5 which will be referred to are the rear axle 8 and the front axle 9. The winch structure embodying this invention includes a frame comprising side bars 10 which are fastened to the rear axle 8 by the U-bolts 11 and are connected at their rear ends by the angle iron 12 having a suitable aperture 13 formed therein, see Fig. 2, by means of which the tractor may be anchored to prevent bodily movement of the same when a heavy load is applied to the winch structure. The front ends of the side bars 10 are connected by the depending yoke structure 14 which has its lower end 14ª suitably bolted to the front axle 9 of the tractor.

In Figs. 1 and 2, the side bars 10 of the tractor frame are illustrated as having suitably secured thereto the bearing members 15 having journaled therein the auxiliary power shaft 16 which has mounted thereon, at one end, a sprocket wheel 17 in alinement with the sprocket pinion 18 mounted upon the power shaft 6. In Fig. 1 a sprocket chain 19 is illustrated as connecting the sprocket wheel 17 and sprocket pinion 18. The remaining end of the auxiliary power shaft 16 has suitably keyed, or otherwise secured, thereto a pinion gear 20.

In Figs. 1 and 3 the forward end portions of the side bars 10 are illustrated as having suitably mounted thereupon, forwardly of the bearings 15, bearing brackets 21 which include the bearing portions 22. These bearing portions 22 have journaled therein a shaft 23 which has suitably fastened to one end a gear 24 shown in Fig. 2 as being constantly in mesh with the pinion 20 carried by the auxiliary power shaft 16.

Loosely mounted upon the shaft 23 between the bearing brackets 21 is a main drum 25 which is illustrated in Fig. 4 as including the cable supporting cylindrical portion 26 mounted upon and suitably secured to the shoulders 27 carried by the end walls or disks 28. Each end wall or disk 28 is provided with an axially extending, concentric brake band race 29.

For the purpose of simultaneously connecting the opposite ends of the main drum 25 to the shaft 23, suitable clutch structures are provided and are operated in unison. The clutch structures are the same at each end of the main drum 25 and a detail description of one is, therefore, considered sufficient. In Figs. 4 and 5 the outer face of one end wall or disk 28 is illustrated as being provided with a plurality of axially projecting bosses 30. Suitably fastened to the shaft 23, as by the key 31, is the hub portion 32 of a cross-bar 33 which is provided with four openings 34. These openings 34 are provided for guiding and bracing the pins 35 rigidly fastened to the pin carrying cross-bar 36 which is formed with a hub portion 37 encircling the hub 32 and having an annular groove 38 formed therein which receives the lower bifurcated end of the clutch fork 39. This clutch fork includes a sleeve portion 40 which is slidably mounted upon the rod 41 carried by the upper ends of the bearing brackets 21.

It will be seen that by sliding the disk 36 with its pins 35 longitudinally upon the shaft 23 and hub 32 of the pin guiding and bracing bar 33, the pins 35 may be moved into and out of engagement with the bosses 30 carried by the main drum 25 for connecting and disconnecting the said main drum with the shaft 23. To produce this movement or connection and disconnection, the sleeve portions 40 of the clutch forks 39 are each connected to respective links 42 which are pivoted thereto and have their free ends pivotally connected to a control lever 43 at equally spaced distances from the pivot support 44 for the said lever and on opposite sides of said pivot support. It will now be seen, by examining Fig. 2, that by moving the control lever 43 toward the left of the winch structure, the links 42 will cause the clutch structures at the opposite ends of the main drum 25 to be moved for disconnecting the said drum from the shaft 23. Conversely, when the control lever 43 is in the position illustrated in Fig. 2, the opposite ends of the main drum 25 will be operatively connected to the shaft 23 and will be driven therewith.

In Figs. 2 and 3, the shaft 23 is further illustrated as having loosely mounted thereupon an auxiliary drum 45 having a one-way operating clutch element 46 formed on one end thereof. Keyed to the same end of the shaft 23, outwardly of the auxiliary drum 45 and capable of being longitudinally moved in respect to said shaft, is a complemental clutch member 47 which is adapted for being moved into engagement or out of engagement with the clutch member 46 for connecting or disconnecting the auxiliary drum 45 with the shaft 23. This clutch member 47 is moved by the clutch yoke 48 having a sleeve 49 loosely mounted upon the rod 41. A reversely bent link 50 is pivotally connected to this sleeve 49 and extends to and is pivotally connected with a second control lever 51 at the point 51'. This second control lever 51 is pivotally connected to the rod 41 at the point 44 which is the pivot support for the first mentioned operating lever 43. It will now be seen that by moving the operating lever 51 toward the left hand side of the winch frame, the auxiliary drum 45 will be operatively connected to the shaft 23 and, conversely, when the operating lever 51 is arranged as shown in Fig. 2, the auxiliary drum 45 will be disconnected from the shaft 23.

In Fig. 1, the brake band races 29 are illustrated as having associated therewith brake bands 52 which are connected at their opposite ends to a rocker arm 53 supported by the shaft 54 which in turn is carried by the bracket 55 secured to the side bars 10. These rocker arms 53 are connected by the rod 56 to a brake lever 57 which may be held in any desired position by the ratchet 58 and pawl 59.

The operation of this winch may be described as follows:

It will first be understood that the power plant of the tractor 5 is employed for driving the winch and that the said winch may be connected to the tractor power plant by means of the speed change mechanism 7 for varying the pulling power of the winch in proportion with the load applied thereto. The operation of the power shaft 6 will necessarily cause the rotation of the shaft 23, due to the train of mechanical elements constantly connecting the same. With the shaft 23 rotating, the control lever 43 may be arranged as shown in Fig. 2 for operatively connecting the main drum 25 to this rotating shaft 23. When the control lever 51 is arranged as shown in Fig. 2, and it will be noticed that it is substantially in alinement with the first mentioned control lever 43, the auxiliary drum 45 is disconnected from the shaft 23. In other words, the main drum 25 is being driven, as shown in Fig. 2, while the auxiliary drum 45 is idle. To disconnect the main drum 25 from the shaft 23, the control lever 43 is moved toward the left hand side of the tractor frame. Such movement of the lever 43 will cause the clutch forks 39 to be moved away from each other for drawing the pins 35 carried by the cross-bars 36 out of engagement with the bosses 30, although still remaining within the apertures 34 formed in the cross-bars 33. With the main drum 25 disconnected from the shaft 23, the control lever 51 may be moved toward the left hand side of the tractor frame for shifting the clutch element 47 into operative engagement with the clutch element 46 whereupon the auxiliary drum 45 will be operatively connected to the shaft 23. It will now be remembered that both of the operating levers 43 and 51 have been moved toward the left hand side of the tractor frame, also, that the main drum 25 has been disconnected and the auxiliary drum 45 connected to the shaft 23. It will be apparent, therefore, that when both of the control levers 43 and 51 are in the positions illustrated in Fig. 2, with the main drum 25 connected to the shaft 23, these control levers may be moved in unison toward the left hand side of the tractor frame for disconnecting the main drum 25 and connecting the auxiliary drum 45. It will be apparent, by examining Fig. 1, that the free ends of the levers 43 and 45 may be simultaneously grasped by one hand for they are supported in close proximity to each other by the supporting frame 60.

It will now be apparent that by grasping both levers 43 and 51 with one hand, and moving the same from one side to the other of the tractor frame, the main and auxiliary drums 25 and 45 may be alternately connected and disconnected to and from the shaft 23. It will, also, be apparent that by locating the control levers 43 and 51 on opposite sides of the supporting frame 60, both of the said drums may be simultaneously connected or disconnected to or from the shaft 23.

It is now believed that the construction and operation of this winch will be clearly understood from the above detail description and that no further explanation is deemed necessary. It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, I claim:—

1. In a device of the type described, a supporting frame, a shaft journaled on said frame, means for driving said shaft, a drum loose on said shaft, and clutching means for connecting and disconnecting said drum and shaft, said clutching means including a plurality of projections on said drum, an apertured cross bar having a hub rigidly fastened on said shaft, a member slidably mounted on a projecting end of said hub and having pins projecting into the apertures of said cross bar, a rod carried by the supporting frame in parallelism with the shaft, a fork slidable on the rod and operatively connected to the slidable member, a lever pivoted to the rod, and a link connecting the lever and fork for causing movement of the lever to project the pins from said apertures for engaging the drum projections.

2. In a device of the type described, a supporting frame, a shaft journaled thereon, means for driving said shaft, a rod carried by said frame in parallelism with said shaft, a drum loose on said shaft, a clutch structure carried by said shaft at each end of said drum, each clutch structure including a member slidably movable toward and away from the adjacent drum end to connect and disconnect the drum and shaft, a fork operatively connected to each movable member and slidable on said rod, a lever pivotally mounted on said rod and projecting laterally in opposite directions therefrom, and a link for each fork pivotally connected to the latter and having their free ends pivotally connected to the lever at opposite sides of said rod, whereby pivotal movement of said lever will cause sliding movement of said clutch members.

3. In a device of the type described, a frame, a driven shaft journaled in said frame, a rod fixed to said frame in parallelism with said shaft, a pair of drums loose on said shaft, a clutch structure for each drum to operatively connect it to said shaft, an operating yoke for each clutch slidable on said rod, a fulcrum pin fastened to said rod, a pair of parallel levers pivoted on said fulcrum pin, and means for connecting said levers to said yokes respectively for causing the pivotal movement of the levers to slide said yokes for operating the clutch structures to connect and disconnect the drums to said shaft.

4. In a device of the type described, a frame, a driven shaft journaled on said frame, a rod fixed to the frame in parallelism with said shaft, a pair of drums loose on said shaft, a clutch structure for each end of one of said drums to operatively connect it to said shaft, a single clutch structure for the remaining drum to operatively connect it to said shaft, an operating yoke for each of said clutch structures slidable on said fixed rod, a fulcrum pin fastened to said rod, a pair of parallel levers pivoted on said fulcrum pin, one of said levers projecting beyond said fulcrum pin, a pair of links connected to the last mentioned lever on opposite sides of said fulcrum pin and to the yokes for operating the clutch structures on both ends of one of said drums, and a link connected to the remaining lever and to the yoke operating the single clutch structure for the remaining drum, whereby the pivotal movement of said levers will connect and disconnect the drums to said shaft.

5. In a device of the type described, a frame, a driven shaft journaled in said frame, a rod fixed to said frame in parallelism with said shaft, a drum loose on said shaft, a clutch structure for one end of said drum to operatively connect it to said shaft, a clutch operating yoke slidable on said fixed rod, a fulcrum pin fastened to said rod, a lever pivoted on said fulcrum pin, and a link connecting said lever to the yoke for causing the pivotal movement of the lever to actuate the clutch structure for connecting and disconnecting the drum to said shaft.

6. In a device of the type described, a frame, a driven shaft journaled in said frame, a rod fixed to said frame in parallelism with said shaft, a drum loose on said shaft, a clutch structure for each end of said drum to operatively connect it to said shaft, an operating yoke for each clutch structure slidable on said fixed rod, a fulcrum pin fastened to the rod intermediate the end planes of the drum, a lever pivoted on said fulcrum pin intermediate its ends, and a link connected to each clutch structure and having their free ends pivotally connected to the lever on opposite sides of the fulcrum pin for causing the pivotal movement of said lever to simultaneously connect and disconnect the opposite ends of said drum to the shaft.

In testimony whereof I affix my signature.

FRANK W. SUTTON.